US012452980B2

United States Patent
Cantudo Franco et al.

(10) Patent No.: US 12,452,980 B2
(45) Date of Patent: Oct. 21, 2025

(54) POWER CONTROL OF A LIGHT ANIMATION PERFORMED ON A LIGHT MODULE

(71) Applicant: VALEO VISION, Bobigny (FR)

(72) Inventors: Miguel Angel Cantudo Franco, Martos (ES); Juan Moris Gomez, Martos (ES); Jesus Jurado Trujillo, Martos (ES)

(73) Assignee: Valeo Vision, Bobigny (FR)

( * ) Notice: Subject to any disclaimer, the term of this patent is extended or adjusted under 35 U.S.C. 154(b) by 63 days.

(21) Appl. No.: 18/559,165

(22) PCT Filed: May 12, 2022

(86) PCT No.: PCT/EP2022/062986
§ 371 (c)(1),
(2) Date: Nov. 6, 2023

(87) PCT Pub. No.: WO2022/238554
PCT Pub. Date: Nov. 17, 2022

(65) Prior Publication Data
US 2024/0244733 A1 Jul. 18, 2024

(30) Foreign Application Priority Data
May 12, 2021 (FR) ........................ 2105029

(51) Int. Cl.
*H05B 47/17* (2020.01)
*H05B 47/16* (2020.01)
(52) U.S. Cl.
CPC ............. *H05B 47/17* (2020.01); *H05B 47/16* (2020.01)

(58) Field of Classification Search
CPC .......... H05B 47/17; H05B 47/16; H05B 45/10
See application file for complete search history.

(56) References Cited

U.S. PATENT DOCUMENTS 10,569,701 B2    2/2020  Martin
10,654,401 B2 *  5/2020  Hamada ................... B60Q 1/18
(Continued)

FOREIGN PATENT DOCUMENTS

CN    112498227 A    3/2021
FR     3054294 A1    1/2018
(Continued)

OTHER PUBLICATIONS

European Patent Office, International Search Report and Written Opinion of corresponding International Application No. PCT/EP2022/062986, dated Aug. 31, 2022.
(Continued)

*Primary Examiner* — Daniel D Chang
(74) *Attorney, Agent, or Firm* — Valeo Vision (57) ABSTRACT

A system for performing light animations on a light module. The system receives a first signal derived from a light power signal and a second signal derived from an animation power signal. The system includes a microprocessor controlling the light module and powered by the second signal. A storage module stores an initial state of the first signal when the microprocessor is activated by the second signal. After it wakes up, the microprocessor determines a light animation to be performed based on the initial state and a current state of the second signal.

10 Claims, 5 Drawing Sheets

(56) References Cited

U.S. PATENT DOCUMENTS 10,993,306 B2     4/2021    Yamamoto
2017/0203685 A1     7/2017    Hirai et al.
2018/0281668 A1*   10/2018    Martin ................... B60Q 1/343

FOREIGN PATENT DOCUMENTS

JP        2016-215877 A    12/2016
JP        2020-155203 A     9/2020
WO      2016/027315 A1    2/2016

OTHER PUBLICATIONS

Japanese Patent Office, Office action corresponding to the Japanese patent application No. 2023-569895 dated Nov. 29, 2024, 2024.

* cited by examiner

POWER CONTROL OF A LIGHT ANIMATION PERFORMED ON A LIGHT MODULE

TECHNICAL FIELD

The present invention concerns the technical field of the power control of a light module, in particular a light module of a vehicle.

In concerns, more specifically, power control of a light module to perform a light animation.

BACKGROUND OF THE INVENTION

Light animations can be performed in addition to signaling/lighting functions of a light module, and are generally performed by a dedicated micro-processor. The microprocessor may receive an input wire for each of the animations to be performed, which encumbers the light system. Also, the micro-processor is generally turned on at the same time of the vehicle, and therefore, it is turned on during periods where no animation is to be performed on the light module.

There is therefore a need to perform light animations on a light module while limiting the number of wires connected to the microprocessor and reducing the power consumption of the micro-processor.

SUMMARY OF THE INVENTION

The present invention improves the situation.

To this end, a first aspect of the invention concerns a system for performing at least one light animation on a light module, wherein the system is arranged for receiving a first signal derived from a light power signal INP1 powering a lighting or signaling function of the light module, and a second signal derived from an animation power signal INP2 powering a light animation of the light module, the system comprising a microprocessor configured to output a light power control signal LIGHT_O to control the light module to perform at least one light animation.

The microprocessor is configured to be powered by the second signal, the system further comprises a storage module configured to store an initial state of the first signal at a time where the microprocessor is activated; and the microprocessor is further configured to, after a wake up period, determine a light animation to be performed and to control the light power control signal LIGHT_O accordingly, based on the initial state of the first signal and a current state of the first signal.

Therefore, the microprocessor is advantageously power on only when needed, that is, when a second signal derived from an animation power signal is received. This allows to reduce power consumption and increase the life span of the microprocessor. In addition, this is allowed while allowing several animations to be performed, based only on values of the first signal at different moments. This reduces congestion associated with the light system. Therefore, the fact of storing the initial state of the first signal allows:
 to perform several animations, by taking into account the initial state and the current state;
 to power the microprocessor only when needed. Indeed, a microprocessor generally takes a certain amount of time to wake up, such as 20 microseconds for example. If the initial state is not stored at that time, it is lost, so that the microprocessor cannot determine which animation is to be performed.

According to some embodiments, the storage module may comprise a latch comprising an input, a clock input and an output, the input may be derived from the first signal, the clock input receives the second signal, and, upon detection of a rising edge of the second signal, the latch may calculate the output based on the input and maintains said output until a new rising edge of the second signal is detected on the clock input. The output supplies the initial state of the first signal to the microprocessor.

This allows to store the initial state of the first signal. As explained above, it allows performing several animations while powering the microprocessor only when needed. Also, the storage of the initial state can be performed by a simple electronic component such as a latch.

In complement, the storage module may further comprise a blanking circuit arranged for delaying the first signal before being supplied to the first input of the latch.

Introducing a delay enables to filter out the first signal. Therefore, fast variations of the first signal are not supplied to the input of the latch. No restriction is attached to the delay introduced by the blanking circuit which may be few milliseconds, such as 2 milliseconds for example. This enables to enhance the accuracy of the storage module.

Still in complement, the blanking circuit may arranged for delaying the first signal from a duration comprised between 1 and 5 milliseconds.

This allows to filter out the first signal, while introducing a delay that is less than the time required by the microprocessor to wake up.

According to some embodiments, the microprocessor may be configured to be turned off:
 on a falling edge of the second signal;
 once the animation is terminated; or
 at the expiry of a predetermined period after the animation is terminated.

Therefore, the power consumption of the microprocessor is optimized.

According to some embodiments, the system further may further a first reception stage comprising:
 a first reception module comprising a first detection stage arranged for deriving a first detection signal from the light power signal INP1;
 a second reception module comprising a second detection stage arranged for deriving a second detection signal from the animation power signal INP2.

Therefore, the power circuitry is not modified as detection stages are used to deriving signal from the power circuitry.

According to some embodiments, the first detection signal may be the first signal derived from the light power signal INP1, the second reception stage may further comprise a conversion stage arranged for converting the second detection signal to an input animation signal, the input animation signal being the second signal powering the microprocessor.

The conversion stage allows to provide an input signal that is optimal for the microprocessor, such as having a nominal value of approximately 5 Volts for example.

According to some embodiments, the microprocessor may be arranged for controlling the light power control signal to perform at least two animations.

Therefore, at least two animations are performed only based on the first signal, more precisely based on values of the first signal at different moments. This allows to perform several animations while reducing the congestion associated with the light system.

According to some embodiments, the microprocessor may be arranged to perform a welcome animation when the initial state of the first signal is low and the current state of the first signal is high.

This is advantageous as the welcome animation is performed upon activation of the light module. According to the invention, the microprocessor is powered at the same time, which allows reducing power consumption of the light system.

According to some embodiments, the microprocessor is arranged for controlling the light power control signal LIGHT_O as a power ramp to perform the welcome animation.

This enables to transition from a null power value to a nominal power value of the light module.

BRIEF DESCRIPTION OF DRAWINGS

Other features and advantages of the invention are made explicit from the description detailed hereafter, and from the attached drawings, on which.

DETAILED DESCRIPTION OF THE INVENTION

Figure 1:
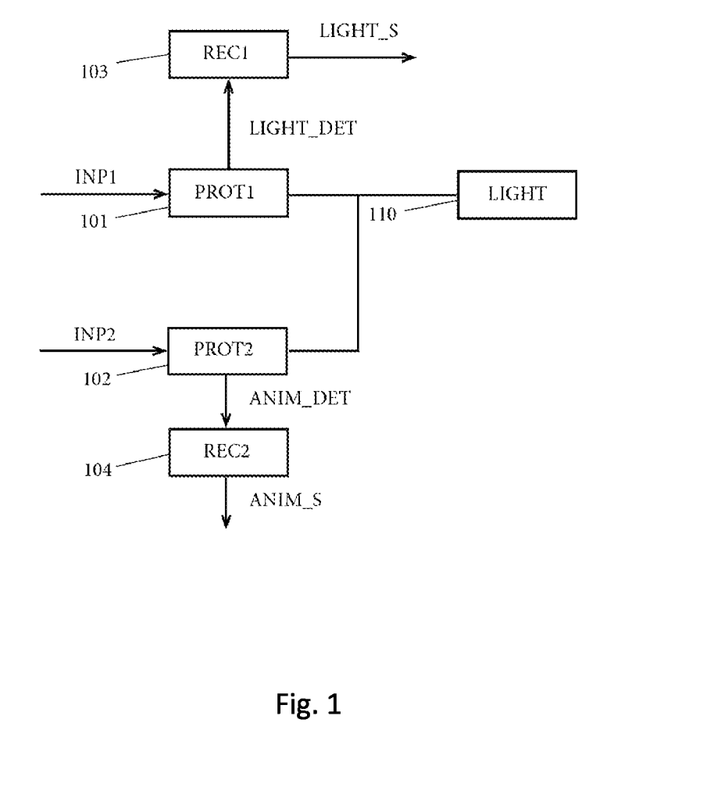
FIG. 1 shows the structure of a powering system for powering a light module, according to some embodiments of the invention.

FIG. 1 shows a powering system for powering a lighting module 110 according to some embodiments of the invention.

The lighting module 110 may be mounted in a vehicle.

The lighting module 110 can be powered by two different input signals issued from one or several power sources of the vehicle. A first input signal is a light power signal for powering the light module 110 in particular when the light module performs a lighting or signaling function. A second input signal is an animation power signal for powering the light module 110 when an animation is performed.

No restriction is attached to what is meant by "animation". It encompasses any function that differs from the main lighting or signaling function of the light module. For example, a first animation may be a welcome animation, when the lighting module 110 is turned on, and a second animation scenario may be a goodbye animation, when the lighting module is turned off. These two scenarios are used hereafter for illustrative purposes. It will be understood that the invention also covers other animation scenarios that are not described hereafter.

The light module 110 may be a tail lighting module, a Daylight Runtime Light, DRL, module, a front fascia lighting module, a rear fascia lighting module, or any module that is arranged to display a light animation and to perform a lighting function. No restriction is attached to the technology corresponding to the light module 110. For example, the light module 110 may be based on LEDs, laser or any other lighting technology powered by an external source.

A first protection circuit 101 is mounted between the first input signal and the light module 110. A second protection circuit 102 is mounted between the second input signal and the light module 110. No restriction is attached to the architecture, design and technology used of the protection circuits. According to the invention, any circuit that is able to protect the light module 110 against inrush currents, over-voltage and other electrical issues, is encompassed in the wording "protection circuit".

The first and second protection circuits 101 and 102 are optional.

The powering system further comprises a first reception module 103 and a second reception module 104.

The first reception module 103 may comprise a first detection stage and a first converting stage. The first detection stage is arranged for deriving a first detection signal LIGHT_DET from the first input signal INP1 and the first converting stage is arranged for converting the first detection signal LIGHT_DET into a light input signal LIGHT_S, which can be used as input for the micro-controller that will be described hereafter. For example, the first input signal INP1 may take discrete values of 0 and 14 volts. The first reception module 103 may be configured to generate an input light signal LIGHT_S that takes discrete values of 0 and 5 volts. This example is given for illustrative purpose only.

The second reception module 104 may comprise a second detection stage and a second converting stage. The second detection stage is arranged for deriving a second detection signal ANIM_DET from the second input signal INP2 and the second converting stage is arranged for converting the second detection signal ANIM_DET into an input animation signal ANIM_S, which can be used as input for the micro-controller that will be described hereafter. For example, the second input signal INP2 may take discrete values of 0 and 14 volts. The second reception module 103 may be configured to generate an input animation signal ANIM_S that takes discrete values of 0 and 5 volts. This example is given for illustrative purpose only.

No restriction is attached to the design and architecture of the first and second reception modules 103 and 104, which may be electronic circuits. It is well known by the person skilled in the art how to convert an input power to a power that is optimal for an output component.

In the embodiment of FIG. 1, two power inputs INP1 and INP2 signals are considered. However, as it will be understood from the following description, the invention applies to a greater number of power input signals. In what follows, the context of two animations, comprising a welcome light animation and a goodbye light animation is considered. However, no restriction is attached to the number and the type of animations managed by the microprocessor. More than two animations may be performed by the system according to the invention, in particular when more than two power input signals are received by the light module 110.

Figure 2:
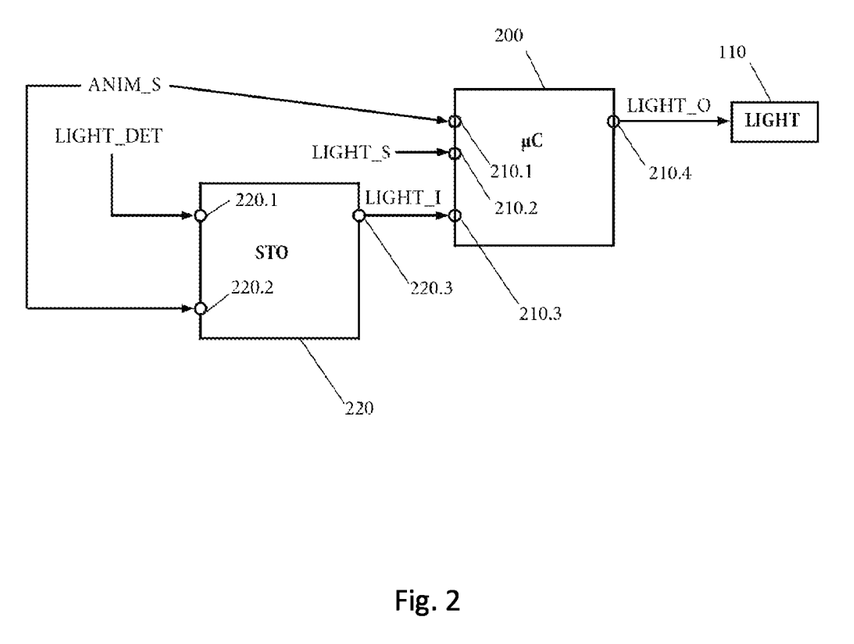
FIG. 2 shows a system for performing a light animation on a lighting module according to some embodiments of the invention.

FIG. 2 shows a system for performing at least one animation according to some embodiments of the invention.

The system comprises a processor 200 such as a microcontroller 200, and a storage module 220.

The storage module 220 comprises a first input 220.1 and a second input 220.2, and an output 220.3.

The first input 220.1 may receive the first detection signal LIGHT_DET or the light input signal LIGHT_S. More generally the first input pin 220.1 receives a signal derived from the first input signal INP1, so derived from a light power signal of the light module 110. In what follows, we consider that the first input 220.1 receives the first detection signal LIGHT_DET for illustrative purpose only.

The second input 220.2 of the storage module 220 may receive the animation input signal ANIM_S or the second detection signal ANIM_DET. More generally, the second input 220.2 receives a signal derived from the second input signal INP2, so derived from an animation power signal of the light module 110. In what follows, we consider that the second input 220.2 receives the animation input signal ANIM_S.

The storage module 220 is configured to store an initial state of the signal received on the first input pin 220.1, so an initial state of the signal derived from a light power signal of the light module 110. To do this, the storage module 220 may maintain an output LIGHT_I on the output pin 220.3. The output LIGHT_I represents an initial state of the power signal of the light module 110, so the initial state of signal LIGHT_S or signal LIGHT_DET.

According to the invention, the wording "initial" refers to the moment where the microprocessor is powered by a signal derived from the second input signal INP2, such as by the animation input signal ANIM_S. This is why the animation input signal ANIM_S is received by the second input pin 220.2, as it constitutes the time reference for storing the initial state of the signal received on the first input pin 220.1. This will be better understood from the description of FIG. 3.

The micro-controller 200 comprises a first micro-controller input pin 210.1, a second micro-controller input pin 210.2, a third micro-controller input pin 210.3 and a micro-controller output pin 210.4. The micro-controller 200 may comprise other pins, which are not illustrated on FIG. 2 and which will not be described hereafter. No restriction is attached to the number of pins of the micro-controller 200.

The first micro-controller input pin 210.1 is configured to receive the animation input signal ANIM_S, which powers the micro-controller 220 according to the invention. This means that when the animation input signal ANIM_S is in a low state, such as 0V, the micro-controller 220 is deactivated, which allows reducing the consumption of the micro-controller 220 and its life span. The micro-controller 220 is therefore only activated when needed, that is, when an animation is to be performed on the light module 110, as it will be better understood from what follows.

Activation of the micro-controller 220 once needed however raises an issue that the activation of the micro-controller 220 is not instantaneous. Indeed, a wake-up time of the micro-controller 220 may for example be comprised between 10 and 30 milliseconds, such as approximately equal to 20 ms. The storage module 220 enables to store the initial state of the light input signal LIGHT_S, by outputting it as output LIGHT_I. Once waken up, the micro-controller 220 therefore may determine the initial state LIGHT_I of the light input signal LIGHT_S and compare it with the current light input signal LIGHT_S to trigger or not a light animation, as will be further explained in what follows.

The second micro-controller input pin 210.2 is configured to receive the light input signal LIGHT_S, which is derived from the first input INP1.

The third micro-controller input pin 210.3 is configured to receive the output LIGHT_I issued from the storage module 220.

Based on the light input signal LIGHT_S and the output LIGHT_I, the micro-controller 220 is configured to determine a light power control signal LIGHT_O to perform at least one light animation on the light module 110. According to some embodiments of the invention, the micro-controller 220 is configured to perform at least two animations by controlling the light power control signal LIGHT_O.

To determine LIGHT_O based on the signals LIGHT_S and LIGHT_I, the micro-controller 220 may be configured to perform a truth table, such as the following truth table for example:
 if TAIL_I is low and TAIL_S is low, then wait for TAIL_S to rise to perform a first light animation, such as a welcome animation for example;
 if TAIL_I is low and TAIL_S is high, then control the light power control signal LIGHT_O so as to perform the first light animation. Indeed, TAIL_I being low means that the light module 110 is initially turned off when the microprocessor is activated. Once waken up, the microprocessor 200 can therefore determine that TAIL_S has transitioned from low to high, and that, therefore, the first light animation is to be performed;
 if TAIL_I is high and TAIL_S is high, then wait for TAIL_S to fall to perform a second light animation, such as a goodbye animation for example;
 if TAIL_I is high and TAIL_S is low, then control the light power control signal LIGHT_O to so as to perform the second light animation. Indeed, TAIL_I being high means that the light module 110 is initially turned on when the microprocessor is activated. Once waken up, the microprocessor 200 can therefore determine that TAIL_S has transitioned from high to low, and that, therefore, the second light animation is to be performed.

The above truth table is only given for illustrative purpose and the invention is not restricted to it. For example, if the input signals are inverted, the micro-controller 220 may be configured based on the complementary truth table. Also, when more than two input signals are received, and when more than two animation scenarios are performed, the micro-controller 220 may be configured based on a different truth table.

Figure 3:
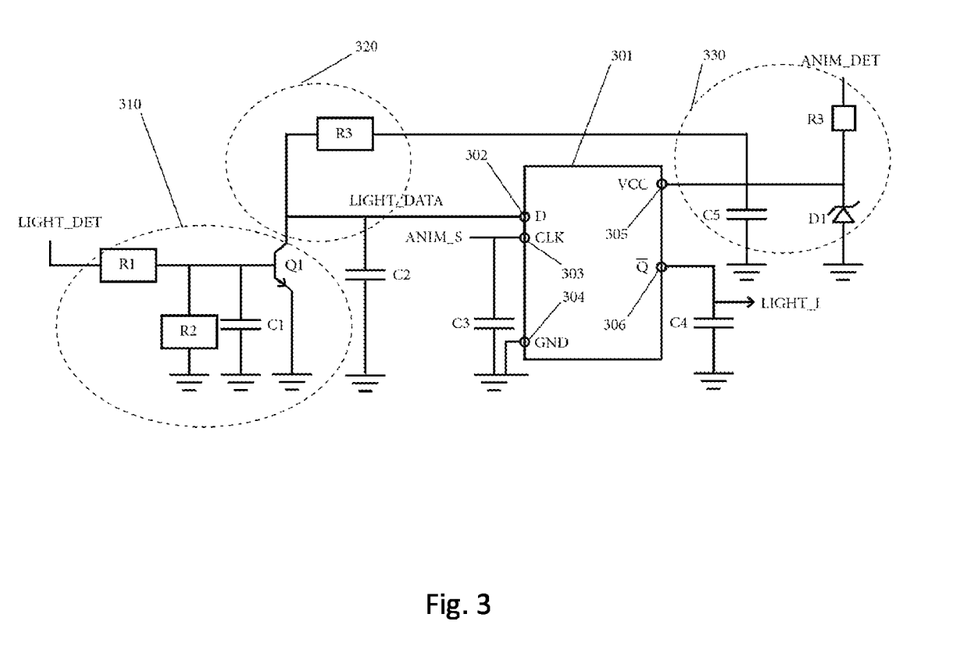
FIG. 3 shows the structure a storage module according to some embodiments of the invention.

FIG. 3 shows an exemplary structure of a storage module 220 according to some embodiments of the invention.

The storage module 220 according to the invention may comprise a latch, or flip flop, 301. The latch 301 may comprise an input D 301, a clock input CLK 303, a ground pin 304, a power input VCC 305 and an output 306. In the example described here, the output 306 is Q bar meaning that the input D is inverted, as will be further explained. However, the output 306 may also be Q by adapting the architecture of the storage module 220.

The latch 301 may be powered by the second detection signal ANIM_DET via a power circuit 330. Alternatively, the latch 301 may be powered by an external source. The power circuit 330 has been represented as comprising a resistor R3, a Zener diode D1 and a capacitor Cs. However, the design of the power circuit 330 may vary, in particular based on the power constraints of the latch 301 and on the power sources that are available.

As explained above, the storage module 220 is configured to receive the first detection signal LIGHT_DET and the animation input signal ANIM_S as inputs.

The animation input signal ANIM_S may be supplied to the clock input 303 as shown on FIG. 3.

According to some embodiments of the invention, the first detection signal LIGHT_DET may be delayed by a blanking circuit 310 and inverted by the inversion circuit 320 to obtain an inverted and delayed signal LIGHT_DATA supplied to the input D of the latch 301.

The blanking circuit 310 introduces a delay to filter out the first detection signal LIGHT_DET. Therefore, fast variations of the first detection signal LIGHT_DET are not supplied to the input D. No restriction is attached to the delay introduced by the blanking circuit 310, which may be few milliseconds, such as 2 milliseconds for example. This enables to enhance the accuracy of the storage module 220.

The blanking circuit 310 is shown as comprising a resistor R1, a resistor R2, a capacitor C1 and a transistor Q1. However, no restriction is attached to the design of the delay circuit 310, which may comprise different components arranged in a different manner.

The inversion circuit 320 is shown as comprising a resistor R3. However, no restriction is attached to the design of the delay circuit 310, which may comprise different components arranged in a different manner.

The inversion circuit 320 and the blanking circuit 310 are optional according to the invention, and the first detection signal LIGHT_DET, or the light input signal LIGHT_S, may be fed directly to the input D 302 according to some embodiments.

The latch 301 may apply the following rules to obtain the output LIGHT_I:
if the input CLK rises and input D is high, Q bar is low;
if input CLK rises and input D is low, Q bar is high.

As explained above, in an embodiment where the first detection signal is not inverted, Q can be used as output. Also, according to some embodiments, falling edges of CLK can be used instead of rising edges.

The output LIGHT_I therefore represents the initial state of the first detection signal LIGHT_DET, or LIGHT_S, derived from the first input signal INP1, because it is stored by the latch 301 at the time where the animation input signal ANIM_S rises, which is the time where the microprocessor 200 is turned on.

Figure 4:
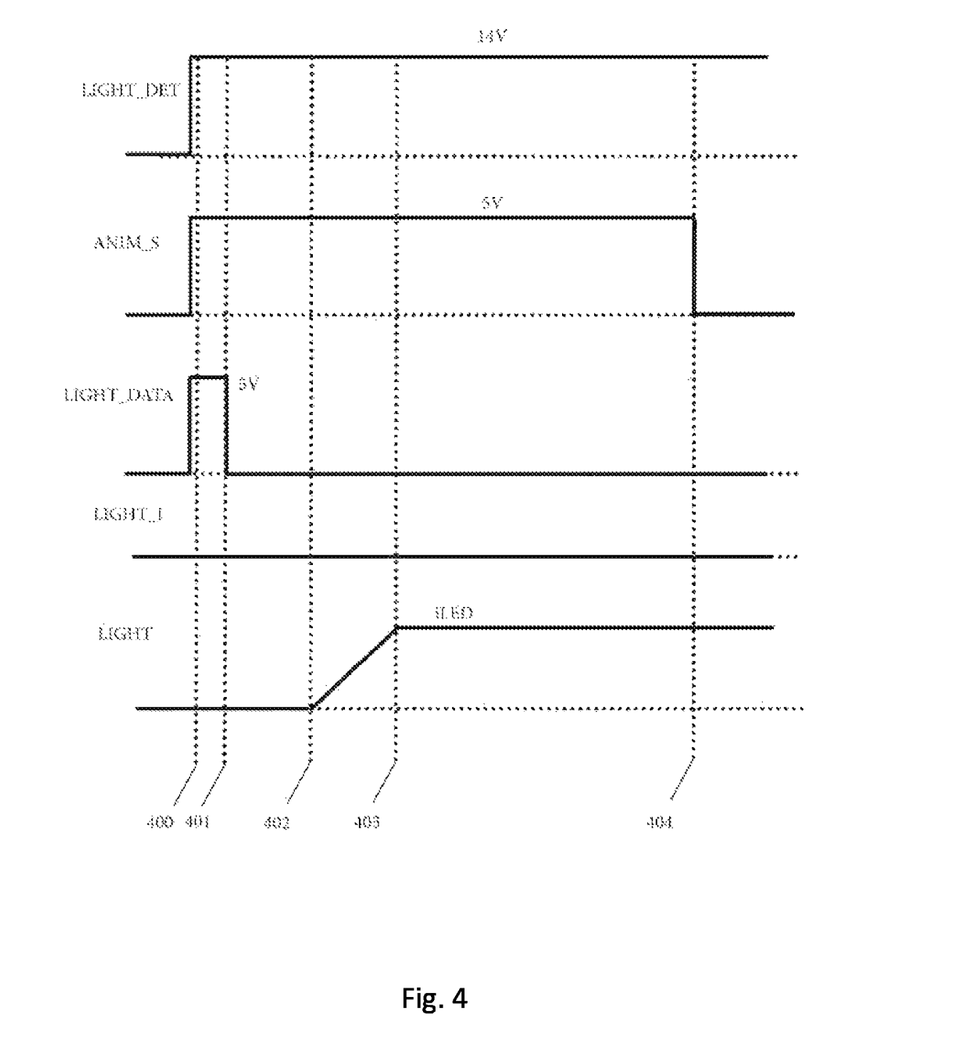
FIG. 4 is a time diagram of the signals processed by the system according to some embodiments of the invention, in a first situation.
Figure 5:
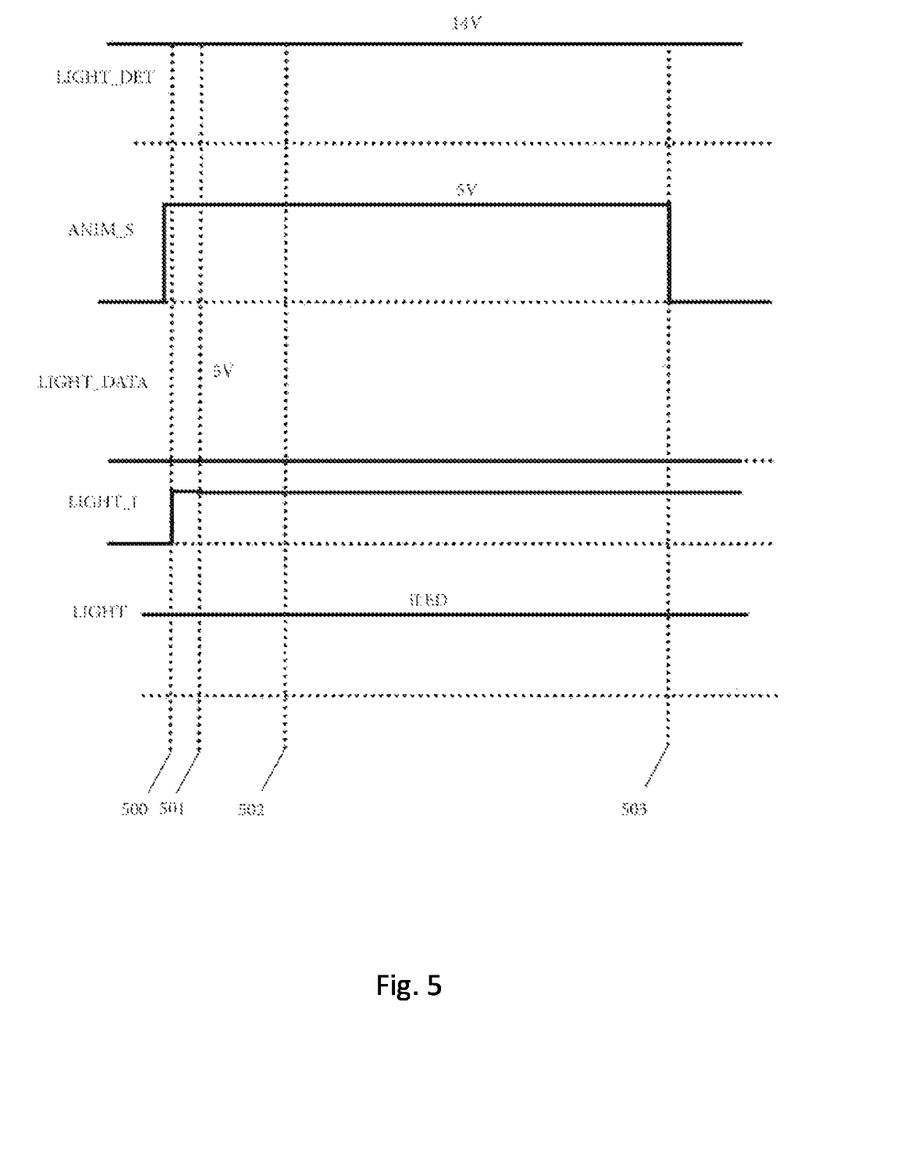
FIG. 5 is a time diagram of the signals processed by the system according to some embodiments of the invention, in a second situation.

The operations performed by the storage module 320, and in particular by the latch 301, will be better understood from the description of FIGS. 4 and 5.

FIG. 4 is a time diagram showing the different signals processed by the system according to the invention, in a first situation.

The time diagram shows the signals LIGHT_DET, ANIM_S, LIGHT_DATA, LIGHT_I and LIGHT in the first situation. LIGHT is a signal powering the light module 110: it can be supplied by the first input signal INP1 or by the output LIGHT_O of the micro-controller 200.

In the first situation, the first input signal INP1 and the second input signal INP2 rise simultaneously. This is detected thanks to the first detection signal LIGHT_DET rising from a low state to a high state, and by the animation input signal ANIM_S rising from a low state to a high state. As explained above, the animation input signal ANIM_S powers the microprocessor 200, which therefore starts waking up at the rising edge of the animation input signal ANIM_S.

As explained above, the signal LIGHT_DATA corresponds to the first detection signal LIGHT_DET which has been delayed and inverted. Before the rising edge, LIGHT_DET was low so that LIGHT_DATA remains high until the delay introduced by the blanking circuit 310 expires.

As explained above, at a first instant 400, and because of the rising edge of the animation input signal ANIM_S supplying the clock input 303, the latch 301 copies the inverse of LIGHT_DATA, which is a low state. LIGHT_I is therefore in a low state at the first instant 400 and is maintained in the low state.

Because it takes a wake up period for the microprocessor 200 to be activated, the signal LIGHT is low at the first instant 400.

A second instant 401 is delayed by the delay of the blanking circuit 310 after the first instant 400. Therefore, at second instant 401, the signal LIGHT_DATA falls because of the rising edge of the first detection signal LIGHT_DET. This is because LIGHT_DATA corresponds to the first detection signal LIGHT_DET after it has been delayed and inverted.

A third instant 402 corresponds to the instant where the microprocessor 200 wakes up and is activated. Therefore, the wake up period of the microprocessor 200 is between the first instant 400 and the third instant 402, and can be equal to 20 ms as already explained.

At third instant 402, the microprocessor 200 compares the initial state LIGHT_I and the current first detection signal LIGHT_DET to determine the light power control signal LIGHT_O. Based on the truth table described above, the microprocessor 200 determines that the first animation, that is the welcome animation, is to be performed. To do this, the light power control signal LIGHT_O is controlled to perform the first animation. In the example shown on FIG. 4, the signal LIGHT is controlled based on the output LIGHT_O which is a power ramp.

At a fourth instant 403, the first animation ends after the power ramp reaches a maximum power value, such as a maximum current value. After the fourth instant 403, the signal LIGHT can be maintained at its maximum value based on the first input signal INP1, and the light module 101 may perform a signaling and/or lighting function.

At a fifth instant 404, the second input signal INP2, and therefore the animation input signal ANIM_S, falls and reaches the low state. Because the animation input signal ANIM_S powers the microprocessor 404, the micro-processor 200 is turned off at instant 404. Alternatively, the microprocessor 404 can be turned off:
at instant 403, once the first animation has been terminated; or
at the expiry of a predetermined duration after instant 403.

The light module 110 is still powered by the first input signal INP1 at the maximum power value after the microprocessor 200 is turned off.

FIG. 5 is a time diagram showing the different signals processed by the system according to the invention, in a second situation.

The time diagram according to FIG. 5 shows the same signals as those described referring to FIG. 4.

In the second situation, the first input signal INP1, and therefore the first detection signal LIGHT_DET, is already in a high state when the second input signal INP2, and therefore the animation input signal, rises.

As explained above, the animation input signal ANIM_S powers the microprocessor 200, which therefore starts waking up at the rising edge of the animation input signal ANIM_S.

As explained above, the signal LIGHT_DATA corresponds to the first detection signal LIGHT_DET which has been delayed and inverted. Before the rising edge, the first detection signal LIGHT_DET was high so that LIGHT_DATA is low.

At a first instant 500, because of the rising edge of the animation input signal ANIM_S supplying the clock input 303, the latch 301 copies the inverse of LIGHT_DATA, which is a high state. LIGHT_I therefore rises in a high state at the first instant 500 and is maintained in the high state.

The light power control signal LIGHT is high at the first instant 500 because it is supplied by the first input signal INP1.

A second instant 501 is delayed by the delay of the blanking circuit 310 after the first instant 500. Therefore, at second instant 501, the signal LIGHT_DATA stays low because the first detection signal LIGHT_DET remains high. This is because LIGHT_DATA corresponds to the first detection signal LIGHT_DET after it has been delayed and inverted.

A third instant 502 corresponds to the instant where the microprocessor 200 wakes up and is activated. Therefore, the wake up period of the microprocessor 200 is between the first instant 500 and the third instant 502, and can be equal to 20 ms as already explained.

At third instant 502, the microprocessor 200 compares the initial state LIGHT_I and the current first detection signal LIGHT_DET to determine the light power control signal LIGHT_O. Based on the truth table described above, the microprocessor determines to wait until the first detection signal LIGHT_DET falls to perform the second animation, that is, the goodbye animation.

Therefore, the output LIGHT_O is low and the signal LIGHT is not modified.

At a fourth instant 503, the second input signal INP2, and therefore the animation input signal ANIM_S, falls and reaches the low state. Because the animation input signal ANIM_S powers the microprocessor 404, the micro-processor 200 is therefore turned off at instant 404.

The present invention is not limited to the embodiments described above as examples: it extends to other alternatives.

What is claimed is:

1. A system for performing at least one light animation on a light module, wherein the system is arranged for receiving a first signal derived from a light power signal powering a lighting or signalling function of the light module, and a second signal derived from an animation power signal powering a light animation of the light module,
    the system comprising a microprocessor configured to output a light power control signal to control the light module to perform at least one light animation, with the microprocessor being configured to be powered by the second signal;
    a storage module configured to store an initial state of the first signal at a time where the microprocessor is activated; and in that
    the microprocessor is further configured to, after a wake up period, determine a light animation to be performed and to control the light power control signal accordingly, based on the initial state of the first signal and a current state of the first signal.

2. The system according to claim 1, wherein the storage module includes a latch having an input, a clock input and an output, wherein the input is derived from the first signal, the clock input receives the second signal, and wherein, upon detection of a rising edge of the second signal, the latch calculates the output based on the input and maintains said output until a new rising edge of the second signal is detected on the clock input;
    wherein the output supplies the initial state of the first signal to the microprocessor.

3. The system according to claim 2, wherein the storage module includes a blanking circuit arranged for delaying the first signal before being supplied to the first input of the latch.

4. The system according to claim 3, wherein the blanking circuit is arranged for delaying the first signal for a duration between 1 and 5 milliseconds.

5. The system according to claim 1, wherein the microprocessor is configured to be turned off:
    on a falling edge of the second signal;
    once the animation is terminated; or
    at the expiry of a predetermined period after the animation is terminated.

6. The system according to claim 1, further comprising a first reception stage including:
    a first reception module having a first detection stage arranged for deriving a first detection signal from the light power signal;
    a second reception module having a second detection stage arranged for deriving a second detection signal from the animation power signal.

7. The system according to claim 6, wherein the first detection signal is the first signal derived from the light power signal;
    wherein the second reception module includes a conversion stage arranged for converting the second detection signal to an input animation signal, the input animation signal being the second signal powering the microprocessor.

8. The system according to claim 1, wherein the microprocessor is arranged for controlling the light power control signal to perform at least two animations.

9. The system according to claim 1, wherein the microprocessor is arranged to perform a welcome animation when the initial state of the first signal is low and the current state of the first signal is high.

10. The system according to claim 9, wherein the microprocessor is arranged for controlling the light power control signal as a power ramp to perform the welcome animation.

* * * * *